United States Patent
Del Rio

(10) Patent No.: US 7,357,619 B1
(45) Date of Patent: Apr. 15, 2008

(54) CROSS OVER FLOW DIVERTER FOR NOISE REDUCTION

(75) Inventor: Eddy H. Del Rio, Royal Palm Beach, FL (US)

(73) Assignee: The Anspach Effort, Inc., Palm Beach Gardens, FL (US)

( * ) Notice: Subject to any disclaimer, the term of this patent is extended or adjusted under 35 U.S.C. 154(b) by 568 days.

(21) Appl. No.: 11/112,248

(22) Filed: Apr. 22, 2005

Related U.S. Application Data

(60) Provisional application No. 60/567,188, filed on Apr. 30, 2004, provisional application No. 60/567,189, filed on Apr. 30, 2004.

(51) Int. Cl.
*F03B 11/04* (2006.01)

(52) U.S. Cl. ............... 415/119; 415/904; 418/270; 138/42; 138/44

(58) Field of Classification Search ........... 415/119, 415/185, 208.2, 211.2, 904; 418/270; 138/42, 138/44
See application file for complete search history.

(56) References Cited

U.S. PATENT DOCUMENTS 3,429,230 A * 2/1969 Quackenbush ............ 418/270
5,525,097 A * 6/1996 Kakimoto ................. 451/295

* cited by examiner

*Primary Examiner*—Edward K. Look
*Assistant Examiner*—Dwayne J White
(74) *Attorney, Agent, or Firm*—Norman Friedland

(57) ABSTRACT

A cris-cross pattern of flow channels serves to divide the flow of fluid and then cross the flow to cause an impact between the flow in each channel to impact against each other to reduce the decibels and noise level created by the flowing of the fluid. In a pneumatic surgical drill the spent air used to power the vane motor is diverted so that the flow of is divided in separate flow paths that cross to allow the air that flows from one of the divided channels impinges on the air flowing from the other of the divided channels. In one embodiment the divided channels or flow passageways is formed in the end cap of the housing of a pneumatic surgical drill and in another embodiment the flow diverter with the divided passageways or channels is formed in a plug the fits into the coaxial hose that connects to the housing of the pneumatic surgical drill.

7 Claims, 2 Drawing Sheets

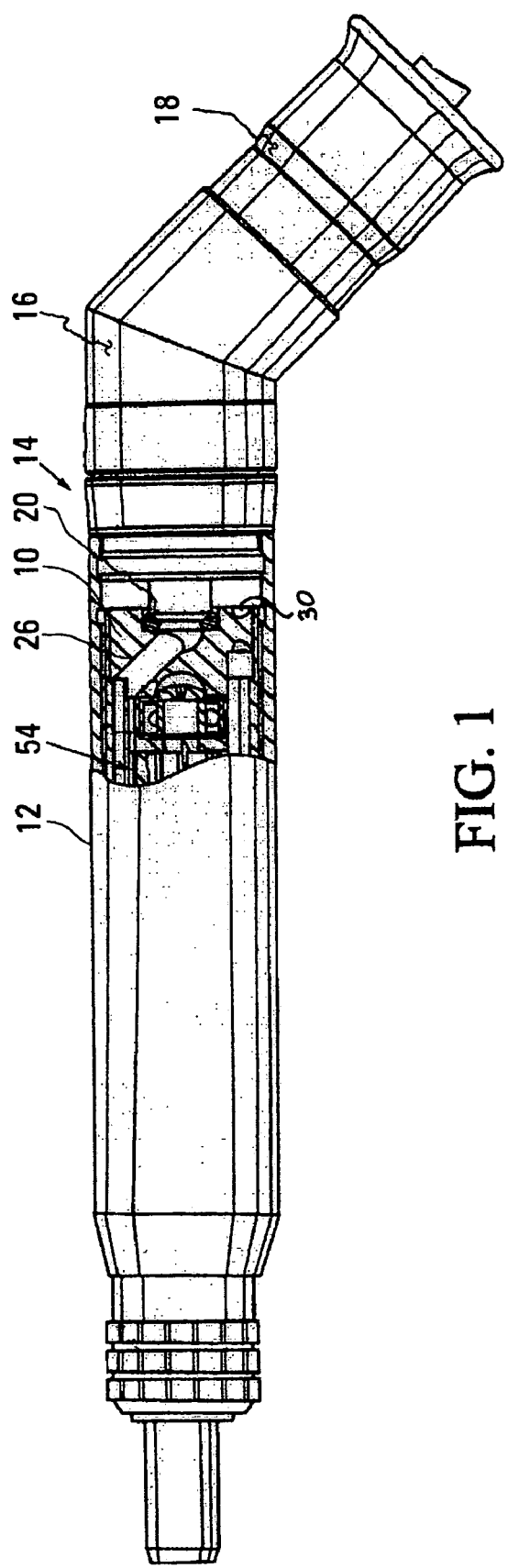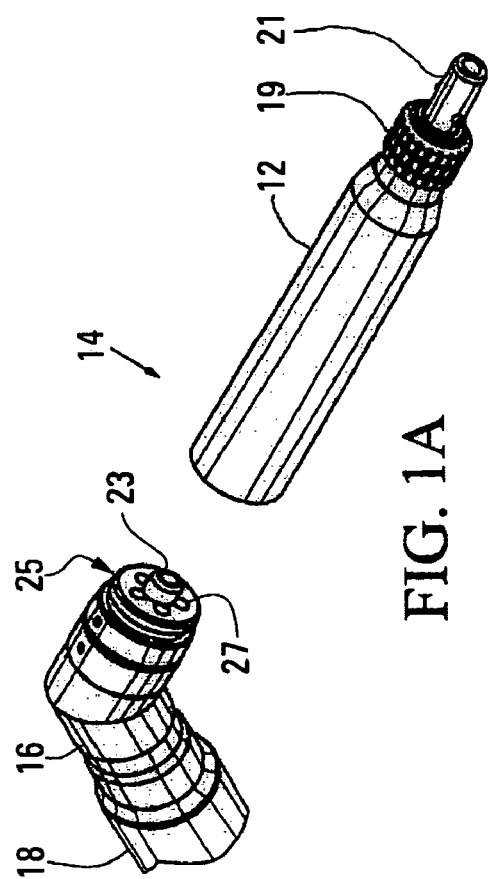
FIG. 1
FIG. 1A

CROSS OVER FLOW DIVERTER FOR NOISE REDUCTION

This application claims the benefits under 35 U.S.C. § 119(e) of the U.S. provisional patent applications 60/567,188 and 60/567,189 filed on Apr. 30, 2004

RELATED APPLICATIONS

This invention relates to the pneumatic motor entitled SURGICAL PNEUMATIC MOTOR and was invented by myself and co-inventor Douglas Perry and identified as Ser. No. 11/082,124 and SURGICAL PNEUMATIC MOTOR FOR USE WITH MRI invented by myself and identified as Ser. No. 11/074,821 both of which were recently filed as non-provisional applications and are incorporated herein by reference and are commonly assigned with this application to The Anspach Effort, Inc.

FEDERALLY SPONSORED RESEARCH OR DEVELOPMENT

Not applicable

TECHNICAL FIELD

This invention relates to attenuating noise created by air flow and particularly to apparatus that flows a fluid in a cris-cross manner to cancel a certain amount of decibels of the noise so as to reduce the overall noise.

BACKGROUND OF THE INVENTION

Rotary machines typically utilize vane motors that are pneumatically powered to cause rotation of the output shaft. As is well known these machines comprise a cylinder, sometimes referred to as a casing and a spindle rotary mounted in a cylinder and eccentrically spaced relative to the center line of the bore of the cylinder, sometimes referred to as a rotor. The cylinder is stationary and through apertures in the cylinder lead pressurized air to impinge on the working face of the reciprocating vanes mounted in slots formed in the spindle to cause the spindle to rotate and then exhaust the spent air through additional holes formed in the cylinder. In surgical pneumatic drills, for example, the spent air is exhausted through the cylinder and is directed toward the aft end thereof to flow into the outer passageway of a coaxial hose that includes an inner passageway that flows the pressurized air into the motor housing which, in turn, is directed to the cylinder for powering the vane motor. The problem that this invention solves is directed to the noise that is generated by the exhaust air that is being returned to the coaxial hose.

This invention solves the noise problem by providing apparatus that includes cris-cross passages that flow the fluid in a judicious manner so that a certain amount of decibels are automatically canceled. Air flow with a pulsating pressure pattern is diverted so that half the flow is directed in one axial passageway and the other half is directed in another passageway. By virtue of flowing a portion the air to flow in separate passageways reduces the amplitude of the pressure. That flow in both passageways are then directed to cross each other. The effect of the flow crossing causes the flow to impinge on the flow from each of the passageways and this impact cancels or nearly cancels the amplitude of the pressure which results in a reduction of decibels and an overall reduction in the noise level. In this invention, one of the embodiments includes an end cap that fits the aft end of the motor of a surgical drill and that has discrete cris cross passages and the other embodiment includes a plug that is inserted into the hose that serves to admit and discharge air and this embodiment includes discrete cris-cross passages to direct the flow of the air in a cris-cross pattern to effectuate the decrease of decibels resulting in an overall reduction of the noise level.

SUMMARY OF THE INVENTION

An object of this invention is to provide apparatus that reduces noise that is generated by the flowing of a fluid.

A feature of this invention is to provide for a rotary machine that includes a pneumatic vane motor apparatus that includes cris-cross passages that flow a portion of air through adjacent passages that intersect whereby the crossing air loses decibels for a reduction in the overall noise created by the flowing air.

Another object of this invention is to provide apparatus that fits into the end of the housing of a vane motor that includes an central passage for leading pressurized air to the vane motor and a plurality of cris-cross passages formed in the apparatus to flow the discharge air from the vane motor. A hose with coaxial passages is attached to the apparatus to flow the discharge air in one of the coaxial passages and pressurized air in another of the coaxial passages.

An object of this invention is to provide apparatus that fits into a coaxial hose where the apparatus includes a central passageway communicating with one of the passages of the coaxial hose and that cris-cross passages formed on the outer periphery of the apparatus in communication with the outer passage of the coaxial hose.

The foregoing and other features of the present invention will become more apparent from the following description and accompanying drawings.

BRIEF DESCRIPTION OF THE DRAWINGS

FIG. 1 is a view in elevation and partly in section illustrating the details of this attachment of this invention to the hose and vane motor;

FIG. 1A is an exploded view in perspective of the device depicted in FIG. 1 showing the invention mounted in the end cap of the housing of a surgical pneumatic motor;

Figure 2:
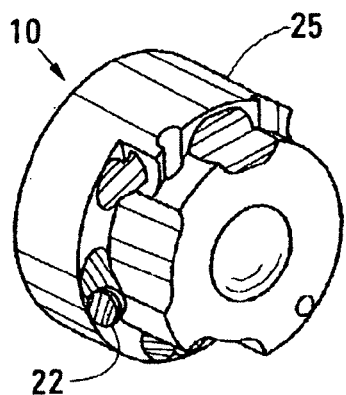
FIG. 2 is a view in perspective of the end cap incorporating this invention.

These figures merely serve to further clarify and illustrate the present invention and are not intended to limit the scope thereof.

DETAILED DESCRIPTION OF THE INVENTION

While this invention is being described in its preferred embodiment as a vane motor that is utilized in a surgical pneumatic drill, as will be understood by those skilled in this art, this invention can by utilized with any type of fluid motor that is desirous of reducing noise developed by the flow of the fluid being utilized.

Reference is now made to FIGS. 1, 1A, 2, 2A, 2B, and 2C illustrating an embodiment of this invention comprising a end cap generally indicated by reference numeral 10 mounted in the housing 12 of the surgical drill generally indicated by reference numeral 14 including the swivel connector 16 and the coaxial hose member 18. The surgical motors are well known and typically include a vane motor, chuck members 19 and 21 for supporting an attachment device and a drill bit (all not being shown). For further details reference should be made to the pneumatic motor entitled SURGICAL PNEUMATIC MOTOR identified as Ser. No 11/082,124 and SURGICAL PNEUMATIC MOTOR FOR USE WITH MRI and identified as Ser. No. 11/074,821, supra or any of the well known pneumatic surgical drills that are commercially available. As shown in FIG. 1 the end cap 10 includes a main cylindrical body 25 having a plurality of passages, namely an inlet passage 20 and the circumferentially spaced outlet passages 22. The inlet passage 20 feeds pressurized air from the hose 18 to the vane motor 54 via the passage 26 and the spent air from the vane motor 24 returns air to the co-axial hose 18 via the passage 30 as will be described in detail herein below.

Figure 2A:
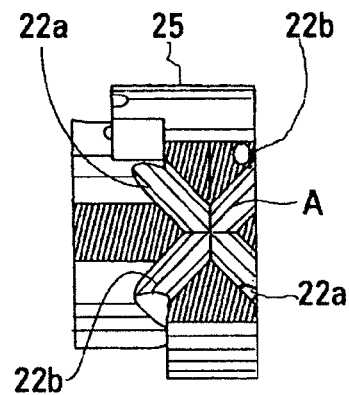
FIG. 2A is a sectional view taken through the center of the end cap depicted in FIG. 2.
Figure 2B:
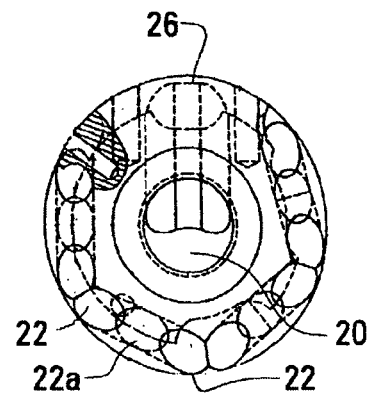
FIG. 2B is an end view illustrating the passages of the end cap depicted in FIG. 2.

As best shown in FIGS. 2, 2A and 2B in accordance with this invention the spent air is admitted from the vane motor to the passage 22 which consists of a plurality of cris-cross passages which are identified with the numeral 22 plus a letter. As shown in FIG. 2B passage 22*a* and passage 22*b* intersect at the junction point A. The dividing the flow and the intersecting of the flow causes the impacting of the two flow streams at point A which serves to reduce the amplitude of the pressure and hence lowers the decibels normally created by the flowing of the spent air that was previously acted on by the vane motor and hence, reduces the overall noise level of the surgical drill. As noted from FIG. 1 the end cap 10 serves to feed pressurized air to the vane motor and return the spent air to the coaxial hose while providing a closure to the end of the housing 12. As seen in FIG. 1 the fitting 25 attaches to the motor housing and includes the outlet passage 23 that mates with inlet passage 20 for feeding inlet air from the coaxial hose 18 to the vane motor and inlet passages 27 that mate with the outlet passages 22 for returning the spent air from the vane motor to the coaxial hose 18. Obviously, inasmuch as the typical system for a surgical drill includes a coaxial hose for delivering the pressurized air and returning the spent air to and from the vane motor, respectively, it will be appreciated that not all systems include coaxial hoses and hence, this system contemplates utilizing other means for feeding the pressurized air and discharging the spent air.

Figure 3:
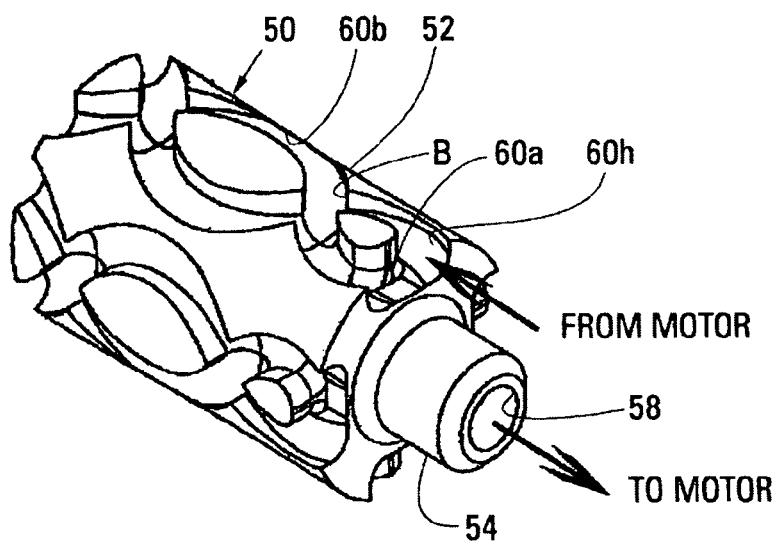
FIG. 3 is a perspective view of another embodiment of this invention and shows the central passage and the cris-cross passages of this invention.
Figure 4:
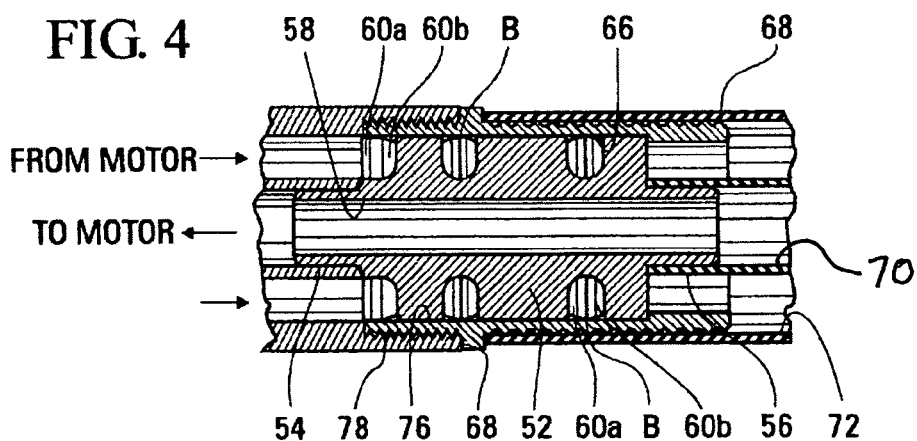
FIG. 4 is a fragmentary view in section illustrating the inventive apparatus mounted in a coaxial tube connected to the housing of a surgical pneumatic motor.

FIGS. 3 and 4 exemplify another embodiment of this invention where the cris-cross passages are formed in a plug-like member that is adapted to fit into a co-axial hose. Again, this invention contemplates the use of this invention where means other than a co-axial hose is utilized. Referring to FIGS. 3 and 4 the plug-like member generally illustrated by reference numeral 50 includes a main cylindrical body 52 having a reduced diameter portion 54 and 56 formed on either end. A central through passage 58 serves to flow the pressurized air to the motor. As noted the outer periphery of the main cylindrical body is designed to include cris-cross passages or channels 60 (reference letters following the numeral indicate cross-over passages) having a plurality of passages 60*a* and 60*b* formed in a "figure eight (8)" design. Similar to the cris-cross passages of FIG. 2A these cris-cross passages intersect at B where the flow from the adjacent passages 60*a* and 60*b* collide, co-mingle and mixes and similarly reduce the decibels of the noise created by the discharge flow of the vane motor of a pneumatic surgical motor and hence, reduce the noise level.

As shown in FIG. 4, the plug design of this invention is inserted into coaxial hose 66 having a central passage 70 and a outer passage 72. End fitting 68 houses the main body 52 and includes threads 76 formed on its outer diameter that mate with threads 78 formed on the inner diameter of housing 12 securing the hose to the housing 12 of the surgical motor.

What has been shown by this invention is a simple, yet effective means, for attenuating the noise level created by the flow of fluid in a surgical pneumatic motor. As mentioned above, the teachings of this invention can be applied to other fluid flowing devices where noise is a problem.

Although this invention has been shown and described with respect to detailed embodiments thereof, it will be appreciated and understood by those skilled in the art that various changes in form and detail thereof may be made without departing from the spirit and scope of the disclosed invention.

I claim:

1. A flow diverter having at least two axial passageways that receive fluid from a single source and divides the flow into each of said two axial passageways and each of said axial passageways cris-cross each other so that the flow in said each of said plurality of passageways collides with the flow in said other of said plurality of passageways whereby the decibels created by the flow of fluid is attenuated.

2. A flow diverter as claimed in claim 1 having a plurality of axial passageways that receive fluid from a single source and divides the flow into each of said plurality of axial passageways and each adjacent axial passageways of said plurality of axial passageways cris-cross each other so that the flow in of said each of said plurality of passageways collides with the flow in the adjacent axial passageways of said plurality of passageways whereby the decibels created by the flow of fluid is attenuated.

3. A flow diverter as claimed in claim 2 wherein said flow diverter includes a cylindrical member, a central axial passageway formed in said cylindrical member for flowing said fluid in one direction, said axial passageways formed as channels in the outer periphery of said cylindrical member for flowing said fluid in an opposite direction.

4. A flow diverter as claimed in claim 2 wherein said flow diverter includes a cylindrical member, a central axial passageway formed in said cylindrical member for flowing said fluid in one direction, said axial passageways being drilled radially spaced from said central axial passageway formed in said cylindrical member for flowing said fluid in an opposite direction.

5. A pneumatic motor having an air driven vane motor, a housing surrounding said vane motor, an end cap mounted on the end of said housing for the closure thereof, a passageway in said end cap having a central inlet for leading air through said passageway to said vane motor, a plurality of axial holes formed in said end cap radially spaced from said central inlet for flowing and discharging the spent air from said vane motor, alternate axial holes of said plurality of axial holes formed in a cris-cross pattern with the adjacent axial hole of said plurality of axial holes for flowing the spent air through said adjacent axial holes to collide before being discharged so as to reduce the decibels of the air that is generated by the vane motor and attenuate the noise of said flowing air.

6. A pneumatic motor as claimed in claim 5 including a coaxial hose attached to said end cap for feeding pressurized air into said inlet and receiving said discharge air from said end cap.

7. A pneumatic motor having an air driven vane motor, a housing surrounding said vane motor, an end cap mounted on the end of said housing for the closure thereof, a passageway in said end cap having a central inlet for leading air through said passageway to said vane motor, a plurality of axial channels formed in said end cap radially spaced from said central inlet for flowing and discharging the spent air from said vane motor, a coaxial hose attached to said housing for leading pressurized air into said central opening and to receive discharge air from said plurality of axial channels, alternate axial channels of said plurality of axial channels formed in a cris-cross pattern for flowing the spent air through said adjacent axial channels to collide before being discharged so as to reduce the decibels of the air that is generated by the vane motor.

* * * * *